E. MARQUARDT.
CULTIVATOR.
APPLICATION FILED OCT. 5, 1917.
1,341,064.
Patented May 25, 1920.
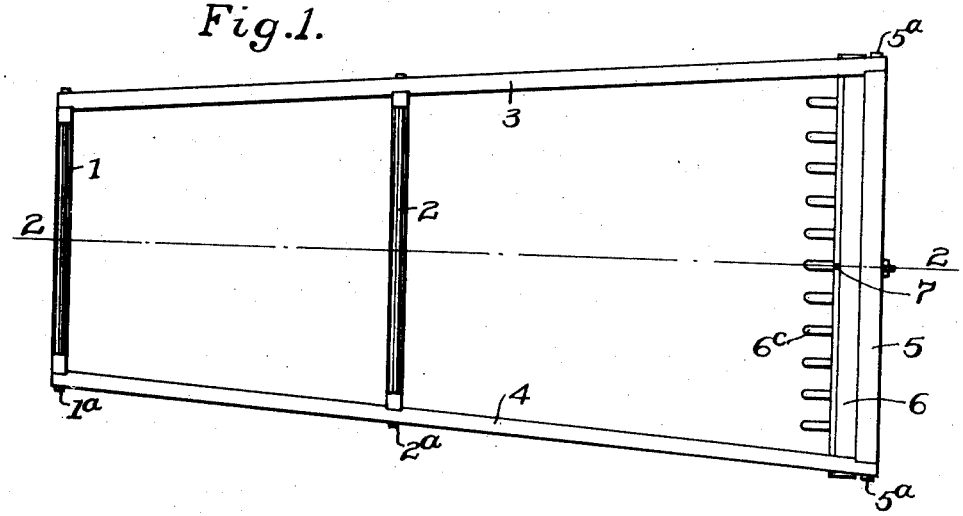
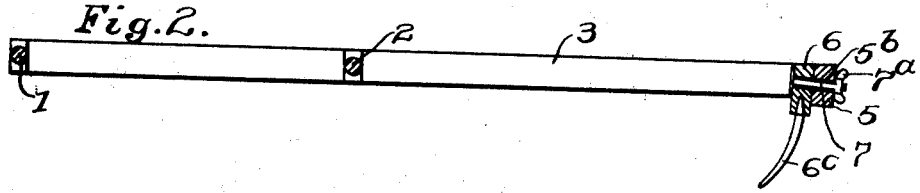
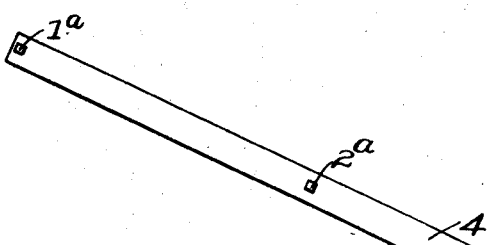
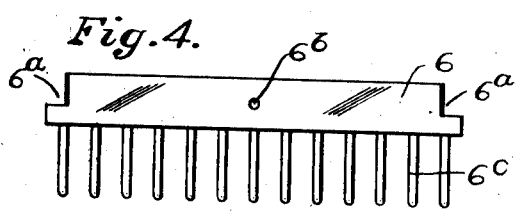
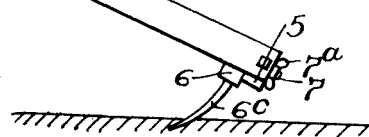
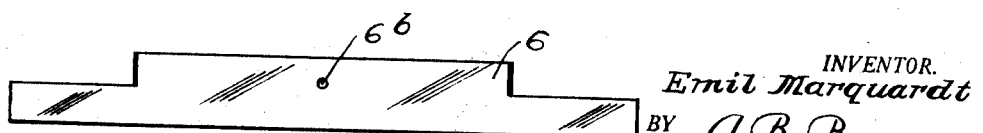
INVENTOR.
Emil Marquardt
BY A.B. Bowman
ATTORNEY

UNITED STATES PATENT OFFICE.

EMIL MARQUARDT, OF LEMON GROVE, CALIFORNIA.

CULTIVATOR.

1,341,064.      Specification of Letters Patent.      Patented May 25, 1920.

Application filed October 5, 1917. Serial No. 194,835.

*To all whom it may concern:*

Be it known that I, EMIL MARQUARDT, a citizen of the United States, residing at Lemon Grove, in the county of San Diego and State of California, have invented a certain new and useful Cultivator, of which the following is a specification.

My invention relates to a cultivator more particularly a cultivator to be manually operated and the objects of my invention are: First, to provide a cultivator of this class which is very simple and economical of construction, durable, easy to operate, easy to repair and will not readily deteriorate or get out of order. Second, to provide a cultivator of this class adapted to be drawn by a man and by the use of which considerable ground can be cultivated efficiently. Third, to provide a cultivator of this class in which different kinds of tools such as a harrow, weeder, leveler, plow or other implement may be readily secured to and detached therefrom, thus making a convertible cultivator.

With these and other objects in view as will appear hereinafter, my invention consists of certain novel features of construction, combination and arrangement of parts as will be hereinafter described in detail and particularly set forth in the appended claim, reference being had to the accompanying drawings and to the characters of reference thereon which form a part of this specification in which:

Figure 1 is a top or plan view of my cultivator showing a harrow or weeder attachment thereon. Fig. 2 is a sectional view through 2—2 of Fig. 1. Fig. 3 is a side elevational view of my cultivator shown in the position when being used with the harrow attachment thereon. Fig. 4 is a front elevational view of said cultivator attachment and Fig. 5 is a front elevational view of a leveler or pulverizing attachment.

Similar characters of reference refer to similar parts throughout the several views of the drawings.

The draft bar 1, intermediate hand bar 2, side beams 3 and 4 attachment support 5, attachment 6, and bolt 7 constitute the principal parts of my cultivator.

The frame structure is preferably composed of wood provided with metallic wearing parts. The draft bar 1, is rounded nearly its full length to provide a handle for the operator. The intermediate bar 2 is of a similar construction and slightly longer. The side beams 3 and 4 are secured to the ends of these bars 1 and 2 by means of screws 1ª and 2ª so that the beams 3 and 4 diverge backwardly, forming a tapering frame. The ends of the bars 1 and 2 being preferably set in slightly to provide rigid joints. Secured between the extended ends of these beams 3 and 4 is the attachment support 5 by means of the screws 5ª and this support 5 is set in slightly to form a rigid joint.

It will be here noted that this support 5 is set on an angle slightly to the beams 3 and 4 for providing a slanting support for the attachment 6 so that the attachment teeth will be on the proper angle to dig into the ground when the cultivator is moving forwardly. This support 5 is provided with a central hole 5ᵇ adapted for the bolt 7. The attachment 6 is provided with notches 6ª in which the beams 3 and 4 are adapted to set, which hold the attachment in proper position and it is secured in position against the front of the support 5 by means of the bolt 7 in holes 5ᵇ and 6ᵇ. This bolt 7 is provided with a winged nut 7ª thus providing for the quick engagement and disengagement of the attachment 6 with the support 5. The attachment 6 may be provided with teeth 6ᶜ or with shovels or other devices as desired or it may be plain and may be extended as shown in Fig. 5 for leveling or pulverizing the ground.

The cultivator is operated as follows: The operator steps in the space between the bars 1 and 2 and beams 3 and 4 and grasping the bar 1 with his hands raises said bar up against his body above the hips then by leaning slightly forward holds the bar 1 in the hands dragging the cultivator attachment in or on the ground. If it is desired to shift the cultivator, turn it around, or move it, he grasps the bar 1 with one hand and the bar 2 with the other hand and by pressing down on the bar 1 and lifting on the bar 2 the attachment end of the cultivator may be raised and turned or shifted as desired.

Though I have shown and described a particular construction, combination and arrangement of parts I do not wish to be limited to this particular construction, combination and arrangement but desire to include in the purview of my invention the construction, combination and arrangement substantially as set forth in the appended claim.

Having thus described my invention, what I claim as new and desire to secure by Letters Patent is:

In a cultivator of the class described, a pair of spaced apart longitudinal beams, a combined handle and draft member mounted between said beams at their ends, a hand member mounted between said beams intermediate their ends, an attachment support secured between the rear ends of said beams provided with a central hole and a cultivator attachment provided with a central hole conforming with the hole in said support and a bolt fitting in said holes, whereby said support and said attachment are rigidly secured together.

In testimony whereof I have hereunto set my hand at San Diego, California, this 29th day of September, 1917.

EMIL MARQUARDT